Sept. 28, 1954  B. K. TICE  2,690,114
WIRE HANDLING MECHANISM FOR BALERS
Filed Dec. 31, 1949  5 Sheets-Sheet 1

INVENTOR.
BRUCE K. TICE
BY
ATTORNEY

Sept. 28, 1954  B. K. TICE  2,690,114
WIRE HANDLING MECHANISM FOR BALERS
Filed Dec. 31, 1949  5 Sheets-Sheet 2

INVENTOR.
BRUCE K. TICE
BY
Alden D. Redfield
ATTORNEY

Sept. 28, 1954           B. K. TICE           2,690,114
WIRE HANDLING MECHANISM FOR BALERS
Filed Dec. 31, 1949                               5 Sheets-Sheet 3

INVENTOR.
BRUCE K. TICE
BY
ATTORNEY

Sept. 28, 1954 B. K. TICE 2,690,114
WIRE HANDLING MECHANISM FOR BALERS
Filed Dec. 31, 1949 5 Sheets-Sheet 4

INVENTOR.
BRUCE K. TICE.
BY
Alden D. Redfield
ATTORNEY.

Sept. 28, 1954

B. K. TICE 2,690,114

WIRE HANDLING MECHANISM FOR BALERS

Filed Dec. 31, 1949

INVENTOR.
BRUCE K. TICE.
BY Alden D. Redfield
ATTORNEY.

Patented Sept. 28, 1954

2,690,114

UNITED STATES PATENT OFFICE 2,690,114

WIRE HANDLING MECHANISM FOR BALERS

Bruce K. Tice, Coldwater, Ohio, assignor to Avco Manufacturing Corporation, Cincinnati, Ohio, a corporation of Delaware Application December 31, 1949, Serial No. 136,258

8 Claims. (Cl. 100—11)

The present invention relates to balers and has particular reference to improved wire handling mechanisms by means of which the wires for binding bales of hay and other such materials are guided and cooperatively positioned relative to a tying mechanism which acts to secure the wires and bind the bales.

Balers of the class to which the present invention relates conventionally incorporate an elongated baler chamber of rectangular cross section into which hay to be baled is introduced periodically. A plunger is reciprocated within the baler chamber, periodically compressing the hay and then receding from the compressed hay to permit the admission of additional material.

Numerous conventional devices are used to facilitate the binding of the compressed hay after a predetermined amount has been accumulated within the baler chamber. Many of these mechanisms are built according to more or less standard principles and incorporate means for encircling the bale being formed by a pair of binding wires disposed in parallel planes. A pair of arcuately swinging, wire-carrying needles are periodically moved through the baler chamber to carry a pair of baling wires from one side of the bale into cooperative disposition with another pair of wires on the opposite side of the bale, the two pairs of wires then being joined by the twisting action of a tying mechanism after which the twisted wires are sheared to create a separate bale.

Despite the well developed state of the baler art, numerous shortcomings exist in current balers which either reduce their effectiveness or lead to inconvenience in practical use. It is, therefore, an object of the present invention to provide a baler which is not only cheap to produce but also simple in construction and very easily adjusted for effective operation.

Another object of the present invention is the provision of a simple cheap needle structure for use with a baler, the improved construction preventing interference, such as encountered in some prior art devices, between the needles and the hay in the course of the needle movement prior to the tying sequence.

A particularly novel feature of the present invention is the provision of a swinging upper wire guide mechanism which facilitates smooth and effective operation of the baler and also facilitates the use of a wire tying mechanism of the type described in application Serial No. 62,265, filed November 27, 1948, now abandoned, on a Baler invented by Bruce K. Tice.

The present invention contemplates the use of the Tice tying mechanism which incorporates a pair of sloted twister pinions having mutually parallel axes of rotation. In the preferred embodiment the tying mechanism is located above the top wall of the baler chamber with the axes of the pinions perpendicular to the longitudinal axis of the chamber. After a sufficient mass of hay has been accumulated and compressed within the chamber, a timing mechanism initiates operation of a pair of pointed, wire-carrying needles which are swung upwardly in an arcuate path transversely through the chamber to deliver a pair of lower binding wires to the twister pinions, a pair of upper wires being constantly in cooperative disposition therewith and under the control of a cam regulated swinging guide mechanism. The guide mechanism has certain unique advantages as will be described more fully hereinafter.

The novel features that are considered characteristic of the invention are set forth in the appended claims, the invention itself, however, both as to its organization and method of operation, together with additional objects and advantages thereof will best be understood from the description of a specific embodiment when read in conjunction with the accompanying drawings, in which:

Figure 1 is a perspective view showing diagrammatically certain parts of the wire guiding and tying mechanisms, the figure also showing the lateral disposition of various components and in particular illustrating the swinging upper wire guide mechanism in cooperative engagement with a rotary control cam. Numerous related components of the baler have been omitted from Figure 1 to avoid complicating the view;

*Structural details*

Figure 2:
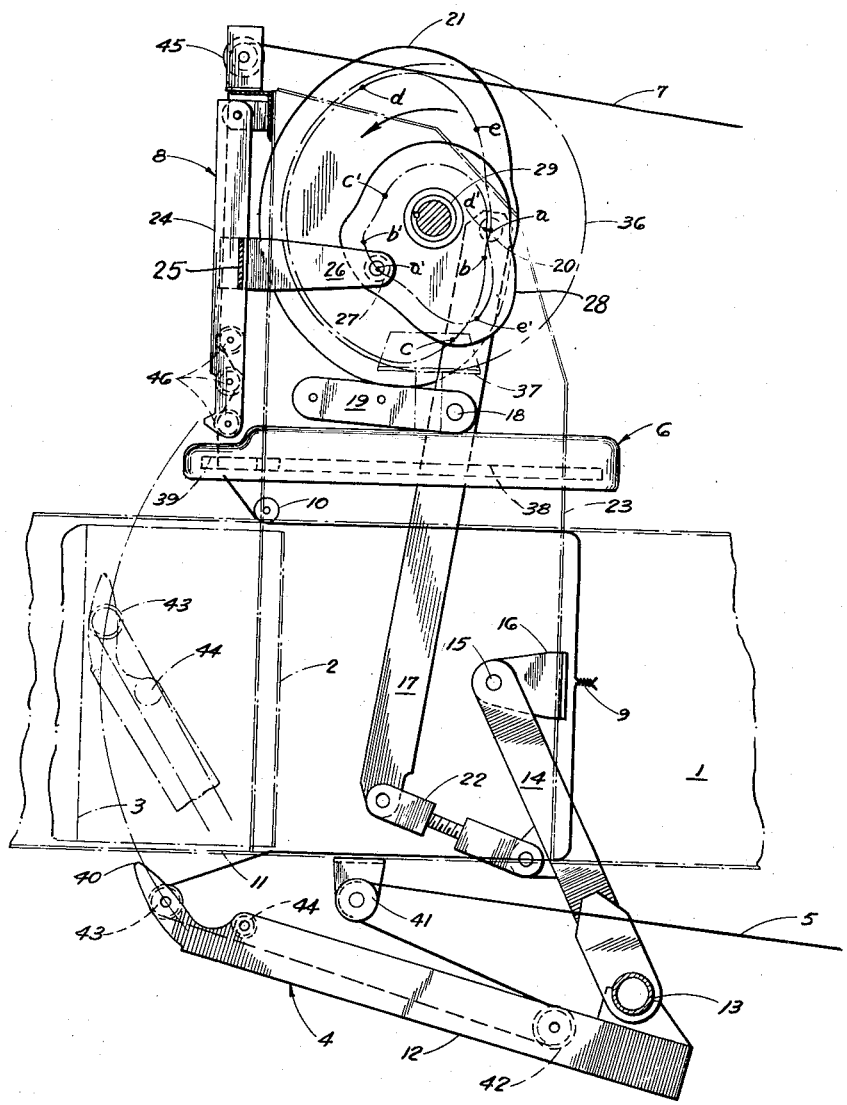
Figure 2 is a vertical longitudinal sectional view of the baler wire handling and tying mechanisms taken on plane 2—2 of Figure 3, showing the relative proportions and inter-relationship of the various components.

As indicated in Figure 2, the present invention may be used to advantage with an elongated baler chamber 1 having a rectangular cross section. A reciprocating plunger 2, shown in its most advanced hay compressing position, is operated within chamber 1 by driving means not shown. In the course of the plunger reciprocation, it periodically recedes from the compressed material to admit additional hay, then moves in a compression stroke to compress the additional hay with that already accumulated within the chamber, and then recedes to repeat the cycle. The reciprocating action of the plunger gradually moves the hay toward the right (as viewed in Figure 2) in the baler chamber, the hay eventually being bound in a bale which is ejected from the right hand end of the chamber (not shown), by the force of the plunger acting on the additional quantities of hay gradually accumulating behind the formed bale.

Slots 3 are formed in the leading end of plunger 2 to permit the unobstructed passage of a pair of wire carrying needles, generally designated 4, in the course of their movement to deliver a pair of lower binding wires 5 to a wire tying mechanism, generally designated 6, located above the baler chamber. Movement of the needles is synchronized with the plunger movement to occur during the latter part of its compression stroke. A pair of upper binding wires 7, controlled by a wire guide mechanism, generally designated 8, are already engaged in the tying mechanism at the time of delivery of wires 5. Wires 5 and 7 are paid out, as required, from supply containers (not shown) at the right end of the baler.

After knotting or tying of the upper and lower pairs of wire by the tying mechanism, each of the twisted portions is sheared into two sections, one section securing the completed bale and the other section remaining within the baler chamber. These remaining sections, indicated at 9, join the upper and lower wires which are gradually carried toward the right along the baler chamber by the advancing mass of compressed hay. The upper wires are guided at their point of entry into the chamber by a pair of transversely spaced guide rollers 10, but the lower wires merely enter the chamber through a pair of longitudinal slots 11 formed in the bottom wall of the chamber.

As the hay is urged to the right (as viewed in Figure 2) by the continuously reciprocating plunger, a timing mechanism in engagement with the advancing hay senses the accumulation of a predetermined amount sufficient to form a bale of required size and initiates the actuation of the wire carrying needles, whereby the lower wires are again delivered to the wire tying mechanism and are again joined to the upper wires. Thus the entire baling-tying cycle is repeated.

A typical form of timing mechanism is shown in Patent 2,497,641, issued on February 14, 1950, disclosing a Baler invented by Wilhelm Vutz, and incorporates a saw tooth wheel mounted for rotation about an axis on the exterior of the baler chamber. The teeth of the saw tooth wheel project through a slot in the baler chamber and are engaged by the hay being accumulated and compressed within the baler chamber. Engagement of the hay with the wheel imparts rotation to it which, after a predetermined amount of angular movement, trips a clutch mechanism thus initiating the tying cycle in phased relationship to the position of the plunger during its compression stroke.

Figure 1:
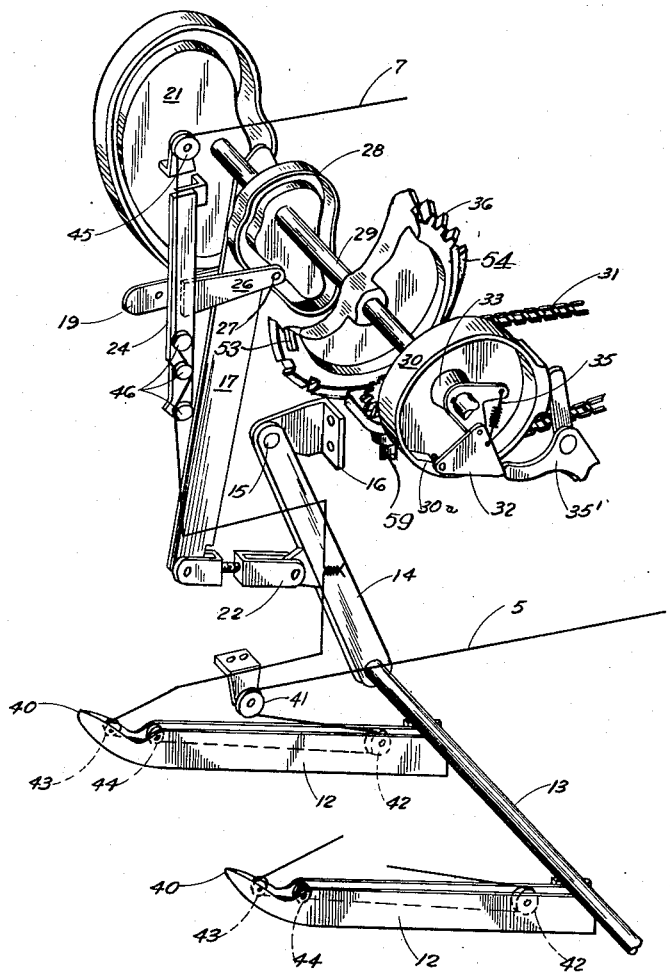

As illustrated in Figures 1 and 2, each wire carrying needle comprises a rigid arm 12 of U-shaped cross section secured to a cross bar 13. Actuating arms 14 are rigidly secured to the ends of the cross bar, and are pivoted on pins 15 secured to brackets 16 which are mounted at the sides of the baler chamber.

Arms 14 are actuated and controlled in their movements by first class type levers 17 which are pivoted on pins 18. These pins are secured to fixed supporting brackets 19 mounted above the top wall and at each side of the baler chamber. A roller type cam follower 20, secured to the upper end of each lever 17, is in engagement with a positive motion, plate type cam 21, which in the course of its rotation imposes controlled swinging movements on the lever. These movements are transferred to arms 14 through adjustable connecting links 22, which permit adjustment of the extreme positions attained by the needles in their travel.

Figure 3:
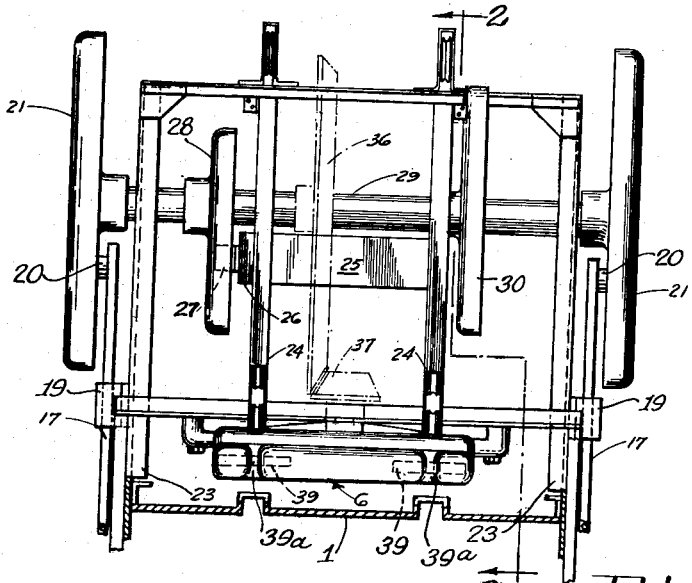
Figure 3 is a front elevational view of the upper wire guide mechanism in cooperative disposition to the twister pinions of the wire tying mechanism.

The upper wire guide mechanism 8 is mounted on rigid frameworks or mounting means 23 secured to the side walls of the baler chamber and extending upwardly therefrom to facilitate the mounting of supporting brackets 19 as well as other parts of the structure to be disclosed hereinafter (see Fig. 3). The guide mechanism comprises a pair of guide arms 24 of U-shaped cross section which are rigidly joined by a cross brace 25. A rearwardly extending cam follower bracket 26 is secured to the cross brace and carries at its extended end a roller type cam follower 27 which is engaged with a positive motion, plate type cam 28, secured for conjoint rotation to a cam shaft 29 to which cams 21 are also secured. Cam shaft 29 is supported for rotation by frameworks 23.

As cam 28 is rotated, predetermined swinging movements are imparted to the guide mechanism whereby the positions of the upper wires relative to the tying mechanism are positively controlled and the upper wires are delivered to the tying mechanism in timed relationship with its tying operation.

A clutch drum 30 is supported by cam shaft 29 and is freely rotatable thereon. A chain 31 is in driving engagement with drum 30, the chain being driven by means (not shown) which also drives the reciprocating plunger. This common driving source permits synchronization of movement of the clutch drum 30 relative to the plunger which is of importance as described later in this disclosure.

A pawl 32 is pivotally secured to a hub 33 keyed to shaft 29. A tension spring 35, stretched between the hub and pawl urges the pawl into engagement with clutch drum 30 at all times, such engagement being permitted by the movement of a stop member 35' away from pawl 32. Rotary motion is imparted to pawl 32 by its engagement with clutch face 30a of the clutch drum in the course of its rotation. When the before mentioned timing mechanism senses that the proper amount of hay has been accumulated, it acts to swing movable stop 35' out of restraining engagement with the pawl, thus permitting a single rotation of cam shaft 29 in response to the driven rotation of the pawl and its associated hub 33. At the end of the single rotation, the pawl is again arrested by the movable stop and the cam shaft remains idle until sufficient hay has been accumulated for the formation of another bale.

Cam shaft 29 rotates cams 21 and 28 to impart controlled movements to the needles and upper wire guide mechanism, respectively. A bevel gear 36 is also fixed to shaft 29 and is in mesh with a pinion 37 through which the tying mechanism 6 is driven. The details of the tying mechanism and its operation in response to the action of the bevel gears is fully described in the hereinbefore mentioned abandoned United States patent application but will be described briefly herein to facilitate an understanding of the present invention.

Figure 5:
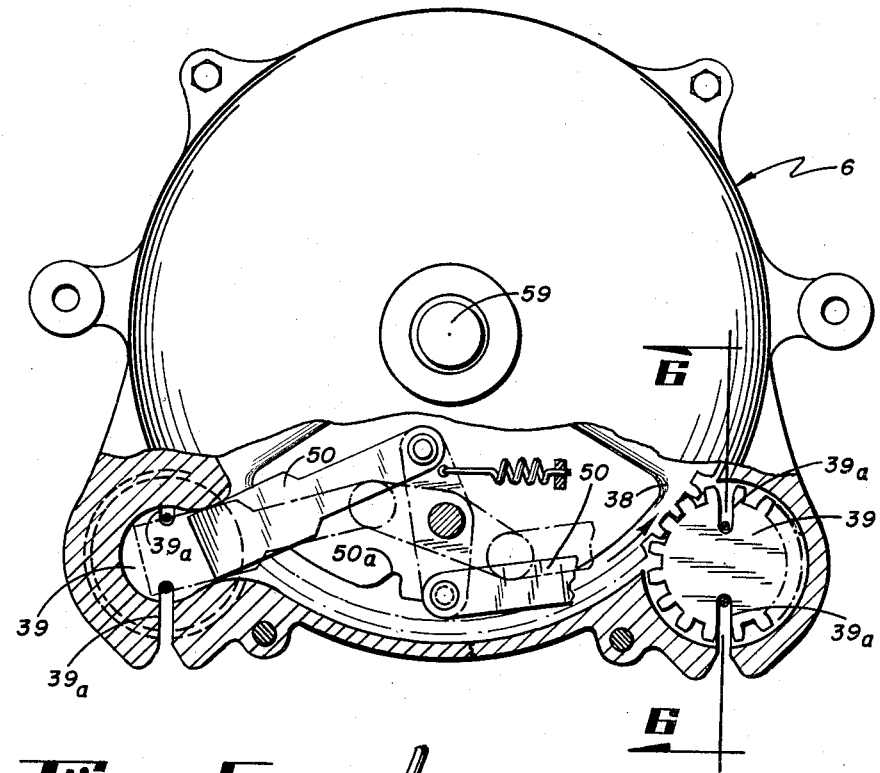
Figure 5 is a top plan view of the tying mechanism with a part of its housing broken away to show its internal construction.
Figure 6:
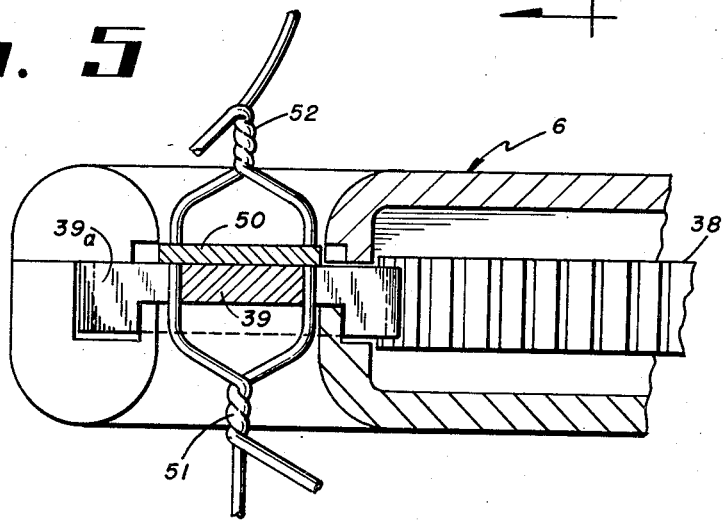
Figure 6 is a fragmentary cross sectional view taken on plane 6—6 of Figure 5.

For the purpose of the present disclosure, it is sufficient to understand that the tying mechanism incorporates a spur gear 38 of relatively large diameter which is in mesh with a pair of twister pinions 39, each twister pinion having a pair of diametrically opposed radial open-ended slots 39a at its periphery. These slots extend partially across the pinions leaving a central portion therebetween. In order to join an upper and a lower binding wire, one wire is held within each slot of the pinion while the pinion is rotated by the spur gear 38 which is driven by bevel pinion 37. As the pinion rotates, the wires are twisted together above and below the pinion thus producing two individual twisted sections. After the twisting action has been completed, a knife mechanism 50 is operated by lobe 50a on gear 38 and moves from the full line to the phantom line position (Figure 5) adjacent the pinion to sever the two twisted sections. Thereafter, the lower section 51 formed by each pinion travels with the completed bale along the baler chamber, the upper sections 52 remaining behind and being drawn downwardly into the baler chamber by the recession of the needles. As described hereinbefore, the wires are then forced to the right along the baler chamber by the gradually increasing mass of hay until the timing mechanism again senses the accumulation of sufficient hay for another bale.

*Novel features and advantages of the structure*

Figure 4:
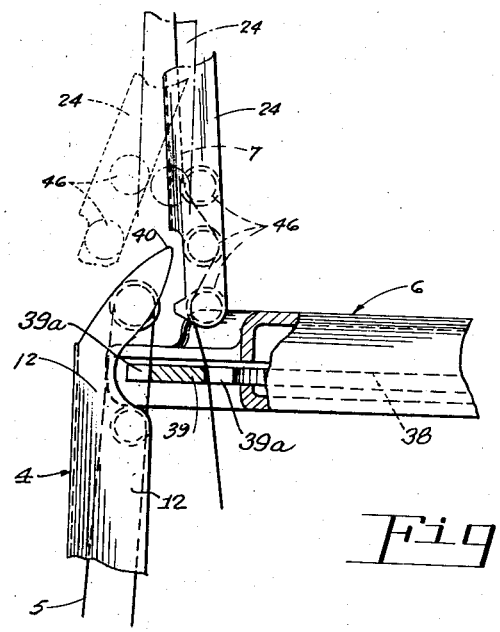
Figure 4 is an enlarged view of the end of a wire carrying needles in its wire-delivering position adjacent one of the twister pinions.

As indicated in Figures 1, 2 and 4 the leading ends of the needles are pointed, as shown at 40. This facilitates passage of the needles through any hay that may have been forced into the clearance slots of the plunger. Another advantage of the pointed ends of the needles is that they preclude carrying hay into the twister pinions of the tying mechanism.

In a baler incorporating arcuately swinging needles of the type herein disclosed, it is particularly desirable to have the needles pass as nearly directly across the baler chamber as possible. In the present construction this is accomplished by the central disposition of pivot pin 15 midway between the top and bottom walls of the baler chamber. As indicated in Figure 2, the path traced by the leading ends of the needles is almost directly across the chamber, and consequently the depth of the slots necessary to permit the passage of the needles through the plunger is relatively small which aids in reducing the required length of plunger.

To favor free and unopposed passage of the needles across the baler chamber and in order to obtain the full advantage of the pointed construction, it is desirable that the wires carried by the needles should be as nearly tangential as possible to the path traced by the leading ends of the needles. This requirement has been met in the present structure by the passage of each lower wire over a stationary flanged roller 41 secured to the bottom wall of the baler chamber, each wire then being passed over movable rollers 42 and 43. A supplemental guide roller 44 is carried into engagement with the wires as the needles are swung upwardly through the chamber as indicated by the intermediate position of the needles shown by phantom lines in Figure 2. With particular reference to this position, it will be obvious that the wire stretched between rollers 43 and 44 is more or less tangential to the path of the needles, and that by virtue of the disposition of the rollers within the U-shaped arms 12, the wires do not obstruct the passage of the needles through the plunger slots.

Figure 4 shows the position of the lower wires at the time of delivery to the twister pinions. It is noteworthy that the location of the pinions, with their axes perpendicular to the longitudinal axis of the baler chamber, favors a ready engagement of the lower wires in the outstanding slots of the pinions.

When the baler is first assembled and all of the cams have been operatively connected with their associated links, it is necessary to manipulate adjusting links 22 so that the needles, at the end of their upward travel, will deliver the lower wires properly to the twister pinions. A very important advantage of the structural arrangement of the needles and tying mechanism is the elimination of any need for sensitive adjustments. This favors cheap and simple production methods and eliminates the need for time consuming adjustments in assembling the balers. The tangential disposition of the wires stretched between rollers 43 and 44 decreases the amount of movement of the wires relative to the twister pinions in response to any given small, angular adjusting movement of the needles compared to that movement that would result were the wires disposed more nearly radially relative to the pivot point of the needles. It will be appreciated by those skilled in the art that this is important in a device of the class herein described where relatively crude cams and operating parts must be employed in the interest of economy.

The use of pointed needles carrying tangentially disposed wires and the use of the two-slot twister pinions are both highly desirable features but means must be provided to prevent dragging of the sheared upper twisted sections of the wires through the slots of the twister pinions by the recession of the needles. The novel structure herein disclosed meets this requirement by the provision of the upper wire guide mechanism which, in response to its operating cam, is swung away from the tying mechanism after the shearing action so that the wires freely clear the twister pinions and have no opportunity to become jammed therein. The cam, controlling the movements of the guide mechanism, is also formed so as to swing the mechanism toward the tying mechanism at the time the needles are in their wire delivery positions, thereby avoiding any interference between the parts. See Figure 4. Thus provision of the guide mechanism permits effective use of other advantageous features of the baler and assures proper operation of the tying mechanism.

As shown in Figures 1 and 2, upper wires 7 are guided by stationary flanged rollers 45 and a series of movable flanged rollers 46 disposed within the U-shaped sections of guide arms 24.

*Operating sequence of the wire handling mechanisms*

With special reference to Figure 2, the sequence of movement of the wire handling mechanisms will be described.

The bevel gear drive of the tying mechanism is intermittent in its operation so that while the bevel gear 36 rotates continuously for a full revolution, bevel pinion 37 meshing therewith rotates intermittently as will be described more fully hereinafter.

Figure 2 shows one needle control cam 21 in correlated angular position relative to plate cam 28 which controls the movement of the guide mechanism. These cams are shown in the at rest position assumed during the period when hay is being accumulated within the baler chamber. The cam shaft, as indicated in Figure 2, rotates counterclockwise, the loci of the center lines of the respective cam followers being indicated by phantom lines. The cam follower locus associated with one of the needle control cams 21 has been subdivided into various operating sections, the junction of the sections being indicated by letters $a$ through $e$, respectively. The cam follower locus associated with cam 28 has been subdivided into corresponding operating periods, the junctions of which are correspondingly lettered $a'$ through $e'$, respectively.

The needle cam followers 20 and guide mechanism follower 27 are located at points $a$ and $a'$, respectively, during the time when hay is being accumulated in the baler chamber. After the baler timing mechanism acts to release pawl 32, clutch drum 30 continues its free rotation on shaft 29 until the clutch face 30a engages the pawl, thus inaugurating rotation of the cam shaft. This rotation begins shortly before plunger 2 reaches the end of its compression stroke.

As cam shaft 29 rotates, follower 20 moves from point $a$ to point $b$, thereby imparting to the needles the first part of their upward travel. During this same period, follower 27 moves from point $a'$ to point $b'$. Since the locus between $a'$ and $b'$ has a constant radius of curvature, the guide arms of the guide mechanism remain at rest in a vertical position. During this same time period, the twister pinions, which were initially at rest with the upper wires engaged in their outstanding slots, are rotated for one-half revolution and again come to rest. By means of the one-half revolution of the pinions, the top wires are carried inwardly toward the center of the tying mechanism, the diametrically opposed slots of the pinions thereby being rotated outwardly in anticipation of the subsequent delivery thereto of the lower binding wires.

Figure 7:
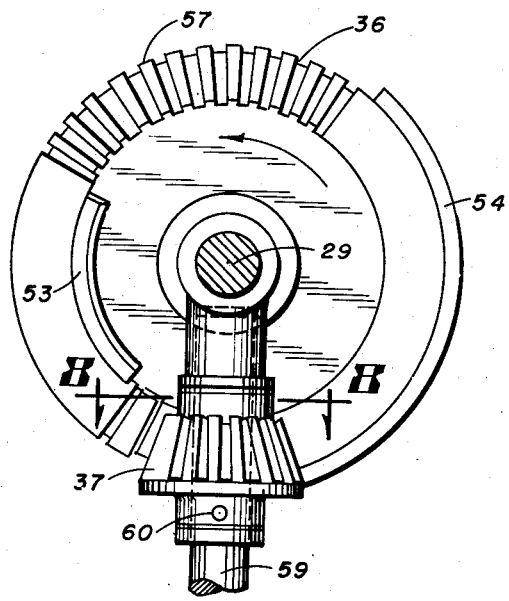
Figure 7 is an elevational view of the bevel gear and pinion drive mechanism for the tying mechanism.
Figure 8:
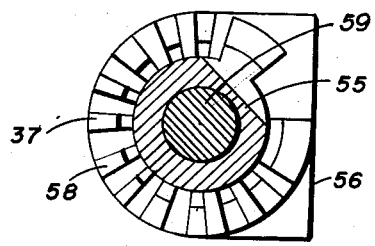
Figure 8 is a top plan view of the bevel pinion, the view being taken on plane 8—8 of Figure 7.

The bevel gear and pinion are shown in Figure 7 in the positions assumed immediately prior to rotation of cam shaft 29 after initiation of movement by the timing mechanism. It will be noted that bevel gear 36 has an inner annular slide 53 and an outer annular slide 54. Pinion 37 is formed with a pair of flat sliding faces 55 and 56 which are positioned for periodic cooperation with slides 53 and 54. In the position shown in Figure 7, face 56 is in sliding engagement with slide 54. As rotation of cam shaft 29 is initiated, gear 36 rotates continuously for one full revolution in the direction indicated. During the first portion of this movement gear 36 imparts a partial rotation to pinion 37 whereby face 55 of the pinion is carried into sliding engagement with slide 53 where it remains during the time that the wires 5 are being delivered to the twister pinions 39. Thereafter, tooth portion 57 of gear 36 engages teeth 58 of pinion 37, thereby imparting about three-quarters of a revolution to the pinion. It will be noted that pinion 37 is pinned to shaft 59, as at 60. As a result, the fraction of a turn imparted to pinion 37 by gear teeth 57 rotates gear 38 which is also secured to shaft 59. It is during this rotation that the wires are twisted together and the joined wires are severed by the knife mechanism 50. After the completion of the severing operation, slide 54 comes into engagement with face 56 and pinion 37 again remains motionless while the wire guide mechanism and needles retreat to their initial starting positions.

Returning to a consideration of Figure 2, during the next period of rotation, follower 20 moves from $b$ to $c$ on cam 21 thereby continuing the upward motion of the needles. Simultaneously, follower 27 moves along the locus of cam 28 from $b'$ to $c'$ thereby swinging the guide arms to the rear toward the tying mechanisms in order to retract them out of the path of the on-coming needles. During this time the pinions remain at rest with pinion face 55 in sliding engagement with slide 53, as has been explained earlier.

The most rearward position attained by the guide arms is shown in full lines in Figure 4 while the vertical position is indicated by phantom lines.

During the next part of the cam shaft rotation while follower 20 moves from $c$ to $d$, the needles are raised to and held at their maximum height, as shown in Figure 4, in which position they deliver the lower wires to the outstanding slots of the twister pinions. The needles are held in this most elevated position while the pinions are rotated for five full revolutions through driving engagement of teeth 57 with bevel pinion teeth 58, as has been explained. The upper and lower wires are thus twisted to form knotted or twisted sections both above and below the twister pinions. At the end of the fifth revolution the wires are sheared by knife mechanism 50 adjacent the pinions which again have come to rest by virtue of the sliding engagement of bevel pinion face 56 with slide 54. During this same time period, follower 27 correspondingly travels from $c'$ to $d'$; but, since the locus between these points has a constant radius of curvature, the guide arms remain at rest in their most rearward position.

Immediately after leaving point $d'$, follower 27 immediately begins forward movement of the guide arms, the guide arms swinging past the vertical position, eventually arriving at their most extreme forward position when follower 27 arrives at point $e'$ on the locus. This forward position is indicated by dash lines in Figure 4. While follower 20 moves from $d$ to $e$ the needles are moved away from the tying mechanism dragging with them the lower wires joined to the upper wires by the twisted sections originally formed above the twister pinions. As these sections are dragged downwardly by the needles, the guide arms hold the top wires away from the tying mechanism, permitting free passage of the sections past the twister pinions and preventing any fouling in the slots of the pinions.

While follower 20 travels from $e$ to $a$, the needles are fully retracted and assume the at rest position at which they remain while additional hay for the next bale is accumulated. Simultaneously, the guide arms are moved from the most forward position to the vertical by movement of cam follower 27 from e' to a'. The guide arms remain in the vertical position until the next tying cycle is initiated by the timing mechanism.

During the last portion of cam rotation, after the shearing of the twisted sections, the twister pinions remain idle. Gear 36 continues to rotate until it arrives at the position shown in Figure 7, at which time it comes to rest with cam shaft 29. During this latter part of the rotation of gear 36, bevel pinion 37 remains at rest with face 56 in sliding engagement with slide 54.

*Summary*

To those skilled in the art, it will be apparent that a baler constructed according to the teaching of this invention will incorporate all the benefits inherent in a pointed needle structure and the tying mechanism disclosed in abandoned United States patent application Serial No. 62,265. It will also be apparent that by virtue of the swinging upper wire guide mechanism, fouling of the tying mechanism is prevented and its proper operation is assured.

Other practical benefits will be recognized such as the ease with which the baler mechanism can be adjusted for proper operation.

Numerous conventional twister pinions, each having a single deep radial slot, are in use in balers today. It should be understood that the invention disclosed herein can be used to advantage in conjunction with these conventional twister pinions as well as with the tying mechanism to which this disclosure has made reference.

Having described a preferred embodiment of my invention, I claim:

1. In a hay baler of the type used for forming bales of compressed hay bound by baling wires, a baler chamber, mounting means secured to and extending above said chamber, a wire tying mechanism secured to said mounting means above said baler chamber, a pair of wire carrying needles pivotally secured to said mounting means for swinging movements about an axis transverse of said baler chamber, said wire carrying needles carrying a pair of binding wires upwardly through said chamber and into engagement with said wire tying mechanism, a swinging wire guide mechanism swingably secured to said mounting means and disposed above said wire tying mechanism for delivering another pair of binding wires to said tying mechanism, a transverse cam shaft rotatably secured by said mounting means above said baler chamber and adjacent said wire tying mechanism and said guide mechanism, a plurality of control cams secured to said cam shaft for conjoint rotation therewith, means secured to said needles and said wire guide mechanism in cooperative engagement with said cams whereby predetermined movements are imparted to said needles and guide mechanism by the rotation of said cam shaft, means secured to said cam shaft for driving said wire tying mechanism, and actuating means for driving said cam shaft.

2. In a baler for producing bales bound with binding wire, an elongated baler chamber, mounting means secured to and extending above said chamber, a tying mechanism including a slotted twister pinion adjacent said chamber and secured to said mounting means, a wire guide mechanism above said wire tying mechanism secured to said mounting means, said wire guide mechanism having an arm swingable about a transverse axis for maintaining a binding wire in a predetermined position relative to the slots of said twister pinion, a wire carrying needle disposed beneath said baler chamber and pivotally secured to said mounting means for arcuate movements about a transverse axis, said needle in its movement passing upwardly through said chamber from its bottom side to its top side where said tying mechanism is located, said needle delivering another binding wire to said twister pinion in the course of its movements, said pinion having its axis of rotation substantially normal to the length of said chamber and also substantially normal to the pivotal axes of said needle and the arm of said guide mechanism, said swingable arm being movable to supply its binding wire to said twister pinion in advance of the arrival of the binding wire carried by said needle and also being movable to eject from said twister pinion the binding wires after completion of the tying operation, a cam shaft rotatably supported by said mounting means, and cam type actuating means on said cam shaft for imparting correlated movements to said needle, said wire guide mechanism, and said tying mechanism.

3. In a hay bailer for producing bales bound with binding wire, an elongated baler chamber, rigid mounting means secured to the sides of said chamber and extending upwardly therefrom, a wire tying mechanism adjacent the top of said chamber and secured to said mounting means, said mechanism including a rotary twister pinion defining slots for receiving binding wires, a movable wire guide mechanism swingably mounted above said tying mechanism on said mounting means for arcuate swinging movements in the direction of the length of the chamber and about a transverse axis parallel to the top of said chamber, a wire carrying needle for delivering another binding wire to said twister pinion, said needle being swingably secured at the sides of said chamber to said mounting means for arcuate movements upwardly through said chamber from the bottom thereof to the tying mechanism at the top thereof, said needle being swingable about an axis transverse of said chamber, the axis of rotation of said twister pinion being substantially normal to the length of said baler chamber and the axes of rotation of said needle and guide mechanism, a transverse shaft rotatably secured to said mounting means, and cam type actuating means secured to said cam shaft for imparting coordinated movements to said guide mechanism and said needle, said guide mechanism being cam controlled to deliver its binding wire to said twister pinion sequentially with and in advance of the delivery by said needle of its binding wire, said guide mechanism also being movable to eject from the twister pinion the tied binding wires at the conclusion of the tying operation and after movement of said needle away from said tying mechanism.

4. In a hay baler of the type used for forming bales of compressed hay bound by binding wires, a baler chamber, a wire tying mechanism fixedly spaced relative to said baler chamber, a pair of wire carrying needles mounted for swinging movements about a fixed axis transverse of said baler chamber, said wire carrying needles carrying a pair of binding wires upwardly through said chamber and into engagement with said wire tying mechanism, a swinging wire guide mechanism positioned for swinging movements about an axis which is fixed relative to said chamber and disposed above said wire tying mechanism for delivering another pair of binding wires to said tying mechanism, a transverse cam shaft rotatably positioned adjacent said chamber, a plurality of control cams secured to said cam shaft for conjoint rotation therewith, means secured to said needles and said wire guide mechanism in cooperative engagement with said cams whereby predetermined movements are imparted to said needles and guide mechanism by rotation of said cam shaft, means secured to said cam shaft for driving said wire tying mechanism, and actuating means for driving said cam shaft.

5. In a hay baler of the type used for forming bales of compressed hay bound by binding wires, a baler chamber, a wire tying mechanism fixedly spaced relative to said baler chamber, a wire carrying needle mounted for swinging movements about a fixed axis transverse of said baler chamber, said wire carrying needle carrying a binding wire upwardly through said chamber and into engagement with said wire tying mechanism, a swinging wire guide mechanism positioned for swinging movements about an axis which is fixed relative to said chamber and disposed above said wire tying mechanism for delivering a second binding wire to said tying mechanism, a transverse cam shaft rotatably positioned adjacent said chamber, cam means secured to said cam shaft for conjoint rotation therewith, means secured to said needle and said wire guide mechanism in cooperative engagement with said cam means whereby predetermined movements are imparted to said needle and guide mechanism by rotation of said cam shaft, means secured to said cam shaft for driving said wire tying mechanism, and actuating means for driving said cam shaft.

6. In a hay baler of the type used for forming bales of hay bound by binding wires, a baler chamber, a wire tying mechanism fixedly positioned adjacent said baler chamber, a pair of wire carrying needles mounted for swinging movements about an axis which is fixed relative to said chamber, said wire carrying needles carrying a pair of binding wires through said chamber and into engagement with said wire tying mechanism, a swinging wire guide mechanism positioned for movement about a fixed axis adjacent said tying mechanism for delivering another pair of binding wires thereto, a cam shaft adjacent said baler chamber, cam means secured to said cam shaft for conjoint rotation therewith, means interconnecting said cam means and said needles and wire guide mechanism, and means on said cam shaft for driving said wire tying mechanism, the rotation of said cam shaft imparting predetermined sequential movements to said tying mechanism, wire guide mechanism and needles for binding a bale with binding wires.

7. In a baler for producing bales bound with binding wire, a baler chamber, a tying mechanism having a rotary twister pinion secured to said chamber, said twister pinion having diametrically opposed wire receiving slots, a wire guide mechanism secured adjacent said tying mechanism for delivering a binding wire to one slot of said twister pinion, a wire carrying needle secured adjacent said baler chamber for arcuate movements through said chamber from the side remote from said tying mechanism to the tying mechanism side, said needle during its movement across said chamber delivering thereby another binding wire to the other slot of said twister pinion, a cam shaft adjacent said tying mechanism, means on said cam shaft for driving said wire tying mechanism and for rotating said twister pinion intermittently to position its slots in wire receiving positions and for tying operation, cam means secured to said cam shaft, means interconnecting said cam means and said needle and said wire guide mechanism whereby sequential movements are imparted to them for delivering the binding wires sequentially to the slots of said twister pinion, and means for rotating said cam shaft.

8. In combination in a hay baler for producing bales which are bound by a first and a second baling wire, which are joined by being twisted together, a tying mechanism comprising a rotatable twister pinion having a pair of wire receiving slots, intermittent driving means connected to said pinion, a periodically rotated shaft for driving said intermittent driving means, a cam secured to said shaft for conjoint rotation therewith, a wire carrying needle connected to said cam for controlled movements in response to the rotation thereof, means driven by said shaft for supplying a first wire to one slot of said twister pinion, rotation of said shaft imparting movement to said needle while simultaneously driving said intermittent driving means which first imparts a fraction of a revolution to said pinion and then holds said pinion stationary with the first wire in one of its slots while said needle delivers a second wire to the other slot of said pinion, said intermittent driving means thereafter imparting a plurality of twisting revolutions to said pinion.

References Cited in the file of this patent

UNITED STATES PATENTS

| Number | Name | Date |
|---|---|---|
| 561,265 | Martindale et al. | June 2, 1896 |
| 764,318 | Towner | July 5, 1904 |
| 1,232,643 | Wygant | July 10, 1917 |
| 1,309,168 | Wygant | July 8, 1919 |
| 2,355,644 | Haase | Aug. 15, 1944 |
| 2,355,647 | Haase | Aug. 15, 1944 |
| 2,485,001 | Kane | Oct. 18, 1949 |
| 2,512,896 | Hill et al. | June 27, 1950 |

FOREIGN PATENTS

| Number | Country | Date |
|---|---|---|
| 265,806 | Germany | Oct. 16, 1913 |